United States Patent
Kim et al.

(10) Patent No.: US 11,761,848 B2
(45) Date of Patent: Sep. 19, 2023

(54) METHOD AND SYSTEM FOR DETERMINING MECHANICAL ROBUSTNESS OF AN OVERHEAD STOWAGE BIN FOR AN AIRCRAFT AND DEVICE FOR IMPARTING MECHANICAL LOAD TO AN OVERHEAD STOWAGE BIN FOR AN AIRCRAFT

(71) Applicant: Airbus Operations GmbH, Hamburg (DE)

(72) Inventors: Johann Kim, Pinneberg (DE); Ludger Merz, Hamburg (DE); Tobias Müller, Hamburg (DE); Ulrich Meier-Noe, Paderborn (DE); Maik Simon, Passau (DE); Franz Krause, St. Martin im Innkreis (AT)

(73) Assignee: AIRBUS OPERATIONS GmbH, Hamburg (DE)

( * ) Notice: Subject to any disclaimer, the term of this patent is extended or adjusted under 35 U.S.C. 154(b) by 4 days.

(21) Appl. No.: 16/803,081

(22) Filed: Feb. 27, 2020

(65) Prior Publication Data
US 2020/0278271 A1    Sep. 3, 2020

(30) Foreign Application Priority Data

Mar. 1, 2019 (EP) .................................. EP19160221

(51) Int. Cl.
*G01M 7/08* (2006.01)
*B64D 11/00* (2006.01)

(52) U.S. Cl.
CPC ............. *G01M 7/08* (2013.01); *B64D 11/003* (2013.01)

(58) Field of Classification Search
CPC ................................ G01M 7/08; B64D 11/003
See application file for complete search history.

(56) References Cited

U.S. PATENT DOCUMENTS

| | | | | |
|---|---|---|---|---|
| 5,929,348 A * | 7/1999 | Stein | ................ | G01M 17/0078 73/865.3 |
| 6,609,409 B1 * | 8/2003 | Bock | ...................... | G01M 7/08 73/12.01 |

(Continued)

FOREIGN PATENT DOCUMENTS

| DE | 10 2014 009 478 | 12/2015 |
|---|---|---|
| FR | 2 899 199 | 10/2007 |

(Continued)

OTHER PUBLICATIONS

McGuire R., Longitudinal acceleration test of overhead luggage bins and auxiliary fuel tank in a transport airplane airframe section, Part II, Oct. 2000, U.S. Department of Transportation, Federal Aviation Administration (Year: 2000).*

(Continued)

*Primary Examiner* — Alexander Satanovsky
*Assistant Examiner* — Lyudmila Zaykova-Feldman
(74) *Attorney, Agent, or Firm* — Nixon & Vanderhye P.C.

(57) ABSTRACT

A method is disclosed for determining mechanical robustness of an overhead stowage bin for an aircraft includes repeatedly effecting an impact of a test body against an impact surface of the overhead stowage bin with a predefined impact force by a robotic arm of a manipulator, and investigating damage parameters of the overhead stowage bin.

9 Claims, 3 Drawing Sheets

(56) References Cited

U.S. PATENT DOCUMENTS

| | | | | |
|---|---|---|---|---|
| 6,675,631 | B1* | 1/2004 | Steffan | G01M 17/0078 73/12.04 |
| 2001/0035065 | A1* | 11/2001 | Hashimoto | F16M 11/08 74/490.04 |
| 2004/0011615 | A1* | 1/2004 | Ray | F16F 7/123 188/374 |
| 2005/0040287 | A1* | 2/2005 | Stephan | B64D 11/003 244/118.5 |
| 2010/0294019 | A1* | 11/2010 | Lee | G01M 7/08 73/12.09 |
| 2015/0063973 | A1* | 3/2015 | Girtman | B65G 67/08 901/1 |
| 2016/0075433 | A1* | 3/2016 | Eakins | B64D 11/003 701/49 |
| 2017/0232618 | A1* | 8/2017 | Pidan | G05B 19/19 700/164 |
| 2018/0237166 | A1* | 8/2018 | Iwata | B64D 11/003 |
| 2018/0319022 | A1* | 11/2018 | Yoshimura | B25J 19/0029 |
| 2018/0370043 | A1* | 12/2018 | Hashimoto | B25J 15/0019 |
| 2019/0032758 | A1* | 1/2019 | Yoon | F16H 19/02 |

FOREIGN PATENT DOCUMENTS

| | | |
|---|---|---|
| GB | 2 437 620 | 10/2007 |
| KR | 10-2010-0064561 | 6/2010 |
| KR | 20100064561 A * | 6/2010 |
| WO | 2013/192118 | 12/2013 |

OTHER PUBLICATIONS

Yeong, 2010, Mechanical Test Apparatus for Interior Materials of Automobile, KR20100064561, Espacenet English Translation, Downloaded from the Internet on Sep. 6, 2021 2010 (Year: 2010).*

R. McGuire, 2000, "Longitudinal Acceleration Test of Overhead Luggage Bins and Auxiliary Fuel Tank in a Transport Airplane Airframe Section, Part II" (Year: 2000).*

Yeong, 2010, Mechanical Test Apparatus for Interior Materials of Automobile, KR20100064561, Espacenet English Translation, downloaded from the Internet Sep. 6, 2021 (Year: 2010).*

Mcguire, 2000, "Longitudinal Acceleration Test of Overhead Luggage Bins and Auxiliary Fuel Tankin a Transport Airplane Airframe Section, Part II" (Year: 2000).*

Extended Search Report for EP19160221.8, dated Sep. 16, 2019, 9 pages.

* cited by examiner

METHOD AND SYSTEM FOR DETERMINING MECHANICAL ROBUSTNESS OF AN OVERHEAD STOWAGE BIN FOR AN AIRCRAFT AND DEVICE FOR IMPARTING MECHANICAL LOAD TO AN OVERHEAD STOWAGE BIN FOR AN AIRCRAFT

CROSS RELATED APPLICATION

This application claims priority to European Patent Application EP 19160221.8, filed Mar. 1, 2019, the entire contents of which is hereby incorporated by reference.

FIELD OF THE INVENTION

The present invention pertains to a method for determining mechanical robustness of an overhead stowage bin for an aircraft, a system for determining mechanical robustness of an overhead stowage bin for an aircraft, and a device for imparting mechanical load to an overhead stowage bin for an aircraft.

BACKGROUND OF THE INVENTION

Overhead stowage bins of aircrafts usually serve to stow hand luggage of passengers during flight of the aircraft. The overhead stowage bins typically are positioned within a passenger cabin of the aircraft above the seat rows and attached to a fuselage structure or airframe of the aircraft. Typically, the passengers during boarding the aircraft load the overhead stowage bins by simply placing their luggage items into a receiving space of the respective bin. Since hand luggage items often are of remarkable weight and since passengers usually are not aware of load restrictions the overhead storage bins are subject to high mechanical loads or stress over the lifetime of an aircraft.

Thus, a robust design of the bin is desirable to ensure reliable function of the overhead stowage bins over lifetime of the aircraft. Whether a proposed design of an overhead stowage bin meets the mechanical requirements typically is investigated in field tests.

Document KR 10 2010 064 561 A describes a method for durability evaluation of interior material for an automobile, the method comprising repeatedly applying constant force or displacement to the automobile interior material.

SUMMARY

It is one of the objects of the invention to provide an efficient method for determining or investigating mechanical robustness of an overhead stowage bin for an aircraft.

This object is achieved by a method according to claim 1, by a device according to apparatus claims, and/or by a system as claimed.

According to a first aspect of the invention a method for determining mechanical robustness of an overhead stowage bin for an aircraft is provided. The method comprises repeatedly effecting an impact of a test body against an impact surface of the overhead stowage bin with a predefined impact force by means of a robotic arm of a manipulator and investigating damage parameters of the overhead stowage bin.

According to a second aspect of the invention a robotic device for imparting mechanical load to an overhead stowage bin for an aircraft is provided. The robotic device comprises a manipulator comprising at least one movable robotic arm and a guiding device coupled to the robotic arm. The guiding device comprises a carrier part attached to the robotic arm and a guide mechanism mounted to the carrier part, wherein the guide mechanism defines a guide track and comprises an attachment structure for attaching a test body thereto.

According to a third aspect of the invention a system for determining mechanical robustness an overhead stowage bin for an aircraft is provided. The system comprises a holding frame comprising attachment interfaces for attaching the overhead stowage bin, a measuring device for measuring physical quantities characterizing a damage parameter of the overhead stowage bin, and a robotic device according to the second aspect of the invention.

It is one of the ideas of the invention to investigate mechanical robustness of an overhead storage bin, OHSB, of an aircraft by simulating loading of luggage into and unloading from the OHSB by aid of a test body moved by a robotic arm of a manipulator and investigating or detecting damages of the OHSB resulting from this simulation procedure. In particular, a plurality of impact cycles is performed, wherein each impact cycle comprises moving the test body or impact body towards a surface of the OHSB by means of the robotic arm until the test body impacts or pushes against the surface of the OHSB and retracting the test body from the surface of the OHSB by retracting the robotic arm. Damages such as cracks, deformations, detachment of components, or similar are investigated during and/or after performing the impact cycles. By using a robotic arm of a manipulator for effecting movement of the test body relative to the OHSB, that is, towards and away from the impact surface, the method can be performed in an automated and reproducible manner. For example, the impact or pushing force which is applied to the impact surface may be precisely adjusted. Optionally, the pushing force may be varied for different impact cycles. Further, a plurality of impact cycles, each of which simulating loading of luggage into the OHSB, can be carried out in short time. Therefore, the method remarkably eases and accelerates determining mechanical robustness of the OHSB.

A further idea of the invention is to further ease investigating mechanical robustness of an OHSB by providing a robotic device including a guiding device fixed or mounted to a robotic arm of a manipulator, wherein the guiding device is configured for receiving a testing body or impact body and to allow movement of the testing body relative to the robotic arm. In particular, a carrier part or base body is coupled to a mounting portion of the robotic arm and a guide mechanism is mounted to the carrier part, wherein the guide mechanism comprises an attachment structure for attaching the test body and defines a guide track or moving track for the attachment structure. The guide mechanism is configured to allow movement of the attachment structure along the guide track relative to the carrier part. Thereby, the test body can be accelerated in the direction of the impact surface by the robotic arm and the impact can be effected by stopping or braking the robotic arm. Due to the force of inertia acting on a test body attached to the attachment structure of the guide mechanism when braking the robotic arm, the attachment structure is caused to move along the guide track defined by the guide mechanism and to push against the impact surface of the OHSB. This provides the benefit that a reaction force of the test body when impacting to the impact surface acting on the manipulator is remarkably decreased. A further advantage is that a realistic loading procedure of an OHSB is simulated since passengers typically lift their luggage items into an opening of the OHSB and push it into the OHSB until it contacts a back or side wall of the OHSB. Thus, determining the mechanical robustness of the OHSB can be performed with increased reliability.

Another idea of the invention is to provide a complete system for testing an OHSB with respect to its mechanical robustness, the system including a frame or structure for mounting the OHSB thereto, the robotic device according to the second aspect of the invention, and a measuring device arranged and configured to measure physical quantities characterizing a damage parameter of the OHSB, for example vibrational characteristics or geometric characteristics of the OHSB.

The device of the second aspect may be advantageously used for imparting mechanical load to an OHSB by pushing a test body to a surface of the OHSB, for example in a system of the third aspect of the invention and optionally also in the method according to the first aspect of the invention.

The device according to the second aspect of the invention and the system according to the third aspect of the invention may advantageously be used for performing the method of the first aspect of the invention. The features and advantages disclosed for the method of the first aspect of the invention therefore are also disclosed for the device of the second aspect of the invention and the system according to the third aspect of the invention and vice versa.

According to one embodiment of the method the impact of the test body is effected by performing an impact cycle, the impact cycle comprising accelerating the test body towards the impact surface to a predefined velocity relative to the impact surface by means of the robotic arm of a manipulator, the test body being coupled to the robotic arm by a guiding device, the guiding device comprising a carrier part attached to the robotic arm and a guide mechanism, the guide mechanism defining a guide track and being mounted to the carrier part, wherein the test body is movably guided relative to the robotic arm along the guide track by the guide mechanism, stopping movement of the robotic arm so as to cause the test body moving along the guide track away from the robotic arm and impacting to the impact surface, and retracting the test body from the impact surface by retracting the robotic arm. According to this embodiment, the test body is accelerated in the direction of the impact surface by the robotic arm and the impact of the impact body to the impact surface is effected by stopping or braking the robotic arm. Due to the force of inertia acting on a test body when braking the robotic arm, the test body caused to move away from the robotic arm and, hence, to push against the impact surface of the OHSB, wherein the guide mechanism guides the test body along the guide track during its movement relative to the robotic arm. After pushing the test body against the impact surface, the test body is retracted away from the impact surface by the robotic arm. Thereby, a simple and efficient impact cycle is provided that realistically simulates a loading procedure of an OHSB and improves reliability of the method.

According to a further embodiment the guide mechanism defines a linear guide track. According to some embodiments, the guide mechanism of the guiding device of the robotic device may comprise a guide rail assembly defining a linear guide track. For example, a first rail may be fixedly attached to the carrier part and a second rail guided at the first rail, wherein the second rail forms or comprises the attachment structure for attaching the test body. The linear guide track simplifies mechanical design of the guiding device.

Optionally, the impact cycle further comprises releasing an interlocking mechanism which interlocks the test body stationary relative to the carrier part before the robotic arm stops, and interlocking the test body relative to the carrier part by means of the interlocking mechanism after retracting the test body from the impact surface. That is, during acceleration of the test body towards the impact surface of the OHSB and optionally also when braking of the robotic arm is initiated, the test body is held stationary relative to the carrier part and, thus, relative to the robotic arm by means of an interlocking mechanism which mechanically blocks movement of the test body. Before the robotic arm stops, the interlocking mechanism is brought to a release state so as to allow movement of the test body relative to the carrier part and the robotic arm towards the impact surface. Thereby, the point of time of allowing the test body to travel towards the impact body and thereby the impact force can be advantageously controlled more precise. After retracting the test body from the impact surface, the test body is moved back to its initial position and interlocked again by the interlocking device in its initial or retracted position before release.

According to one embodiment the impact cycle further comprises pivoting the carrier part of the guiding device relative to the direction of gravity such that the test body is moved back towards the robotic arm along the guide track into a retracted position after effecting the impact of the test body to the impact surface. After impacting or pushing to the impact surface of the OHSB, the carrier part is retracted and pivoted, for example by means of an actuator provided at the robotic arm, such that the test body travels back in its initial or retracted position where it can be interlocked again by the interlocking mechanism. Thereby, the degree of automation is advantageously increased further. For example, the test body may be retracted in the retracted position relative to the carrier part again by means of the interlocking mechanism as described above.

According to an embodiment of the method the test body comprises a mass between 3 kg and 23 kg. In particular, the test body may comprises a mass between 5 kg and 20 kg. According to some embodiments, several impact cycles may be performed with various test bodies of different mass. For example, a first row of test cycles may be performed with a test body of 5 kg, a second row of test cycles may be performed with a test body of 12 kg, and a third row of test cycles may be performed with a test body of 20 kg. The range between 5 kg and 20 kg covers a wide range of possible hand luggage weights.

According to one embodiment the test body comprises a volume between 15 $dm^3$ and 70 $dm^3$. This range covers a realistic and wide range of possible hand luggage volumes. Generally, the test body is a rigid body comprising a three dimensional expanse approximately more than 10 liters and equal or less than 70 liters, wherein the test body optionally is substantially cuboid or substantially cylindrical.

Optionally the test body is a hard-top case. That is, the method may use a commercially available suite case as a test body, wherein the suite case is attached to the robotic arm via an interface, for example by means of the guiding device, wherein a flange or similar fixation structure is formed or provided at the suite case for being attached to the guide mechanism. Thus, a very realistic impact scenario is advantageously simulated.

The impact surface of the overhead stowage bin may for example be formed by one of an inner surface of a wall defining an interior of the overhead stowage bin, a surface of a lid for closing the overhead stowage bin, a surface of a stiffening frame of the overhead stowage bin, and a surface of an edge cover covering a front edge of a bottom wall of the stowage bin.

According to a further embodiment of the method investigating damage parameters of the overhead stowage bin comprises capturing vibration characteristics of the overhead stowage bin at least after a predefined number of impacts and/or measuring geometric characteristics of the overhead stowage bin at least after a predefined number of impacts. For example, optical sensors such as cameras capturing a movement of the OHSB, acoustic sensors such as ultrasonic sensor or similar capturing waves reflected by the OHSB, or force sensors such as strain gauges or pressure sensors capturing a progression of force when a test force is applied to the OHSB may be used for capturing vibration characteristics of the overhead stowage bin. The OHSB is a non-ideal rigid body. Therefore, applying a force to the OHSB, for example by impacting the test body to the OHSB, results in a vibration of the OHSB which may be captured as a progression of force or by a progression of movement of the OHSB. When the impact force applied by the test body to the OHSB is constant over a number of impact cycles, which is advantageously possible due to the use of a robotic arm of a manipulator, a damage of the OHSB can be detected by a change in the captured vibration characteristic. For example, it is possible to effect a reference vibration of the OHSB by applying a specific test force to the OHSB before performing the impact cycles, to capture a reference vibration characteristic, to apply the same test force to the OHSB again after a predefined number of impact cycles, to capture a new vibration characteristic of the OHSB, and to compare the new vibration characteristic with the reference vibration characteristic for determining presence of a damage. Since the dampening properties of the OHSB change when cracks or similar occur the vibration characteristic of the OHSB characterizes a damage parameter of the OHSB. Alternatively or in addition, the impact surface may be optically scanned by an optical sensor to detect cracks or indentations or other geometrical changes as geometric characteristics of the OHSB. Of course, geometric characteristics may also be defined by a spatial relationship between components of the OHSB, e.g. an angle between a bottom wall and a side wall of the OHSB or a distance between bottom wall and top wall of the OHSB. Such geometric characteristics may for example be optically measured, e.g. by means of laser distance sensors, cameras or similar devices.

According to an embodiment of the robotic device the guiding device comprises an interlocking mechanism which, in a locking state, interlocks the attachment structure of the guiding mechanism in a stationary position relative to the carrier part and, in a released state, allows movement of the attachment structure along the guide track relative to the carrier part. The interlocking mechanism is configured to mechanically block movement of the attachment structure relative to the carrier part. In particular, the interlocking mechanism, in the locking state, may interlock the attachment structure in a retracted position. For example, when the attachment structure is realized as a rail being mounted and guided to a rail provided at the carrier part, the interlocking mechanism may lock the rails to each other. In its release state, the interlocking mechanism allows relative movement between the attachment structure and the base body, for example by allowing relative movement between the rails. Optionally, the interlocking mechanism may comprise a blocking element movably guided at a structure that is fixed stationary relative to the carrier part, wherein the blocking element in the locking state of the interlocking mechanism is in contact with the attachment structure, for example introduced into a receiving recess of the attachment structure, and wherein the blocking element in the release state of the interlocking mechanism is in retracted from the attachment structure, for example retracted from the receiving recess of the attachment structure. One of the advantages of the interlocking mechanism is that a point of time when the attachment structure and, thus, the test body is released towards the impact surface of the OHSB can be precisely controlled. This further increases flexibility of the method. For example, for varying the impact force, a point of time of releasing the test body during braking or decelerating of the robotic arm can be easily varied.

With respect to directions and axes, in particular with respect to directions and axes concerning the extension or expanse of physical structures, within the scope of the present invention, an extent of an axis, a direction, or a structure "along" another axis, direction, or structure includes in particular that said axes, directions, or structures, in particular tangents which result at a particular site of the respective structures, enclose an angle which is smaller than 45 degrees, preferably smaller than 30 degrees and in particular preferable extend parallel to each other.

With respect to directions and axes, in particular with respect to directions and axes concerning the extension or expanse of physical structures, within the scope of the present invention, an extent of an axis, a direction, or a structure "crossways", "across", "cross", or "transversal" to another axis, direction, or structure includes in particular that said axes, directions, or structures, in particular tangents which result at a particular site of the respective structures, enclose an angle which is greater or equal than 45 degrees, preferably greater or equal than 60 degrees, and in particular preferable extend perpendicular to each other.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
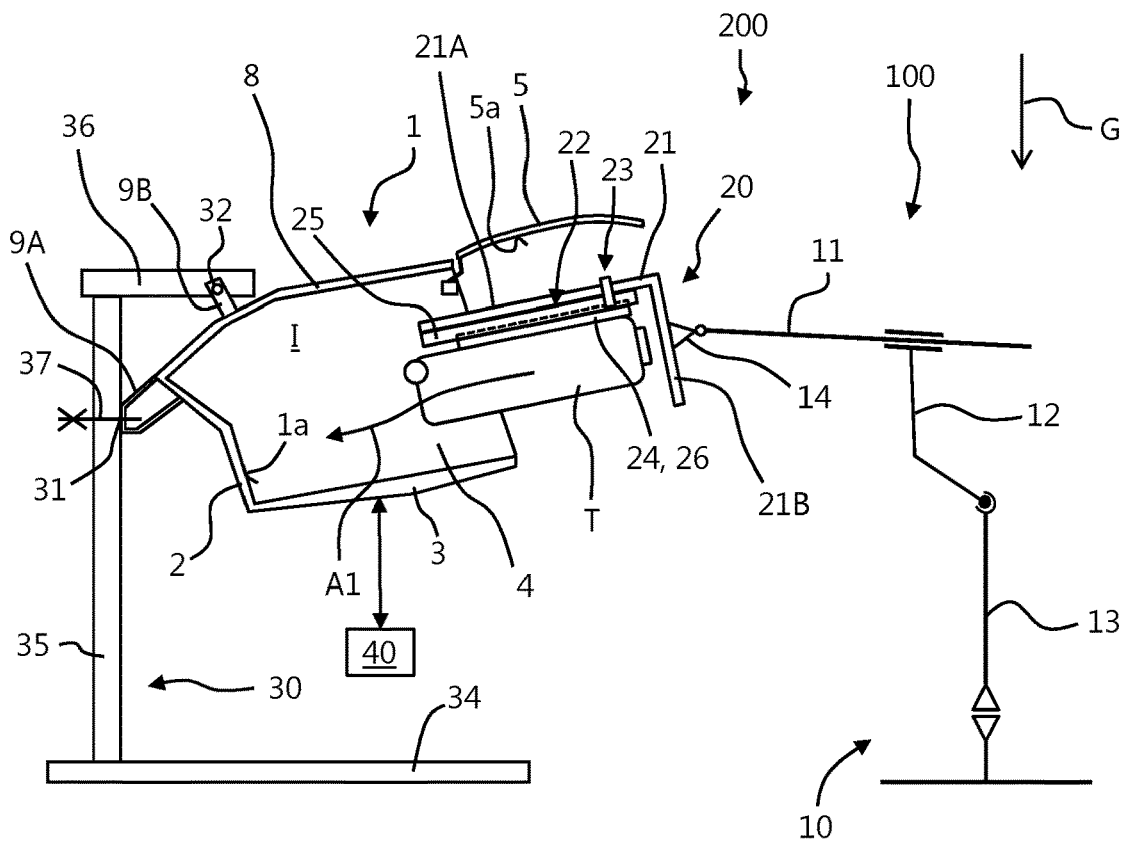
FIG. 1 schematically illustrates a system for determining mechanical robustness an overhead stowage bin for an aircraft according to an exemplary embodiment during performance of a method according to an embodiment of the invention.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

FIG. 1 exemplarily shows a system 200 for determining mechanical robustness an overhead stowage bin 1 for an aircraft. The system 200 comprises a holding frame 30 for holding the overhead stowage bin, OHSB, 1, a measuring device 40, and a robotic device 100.

Figure 6:
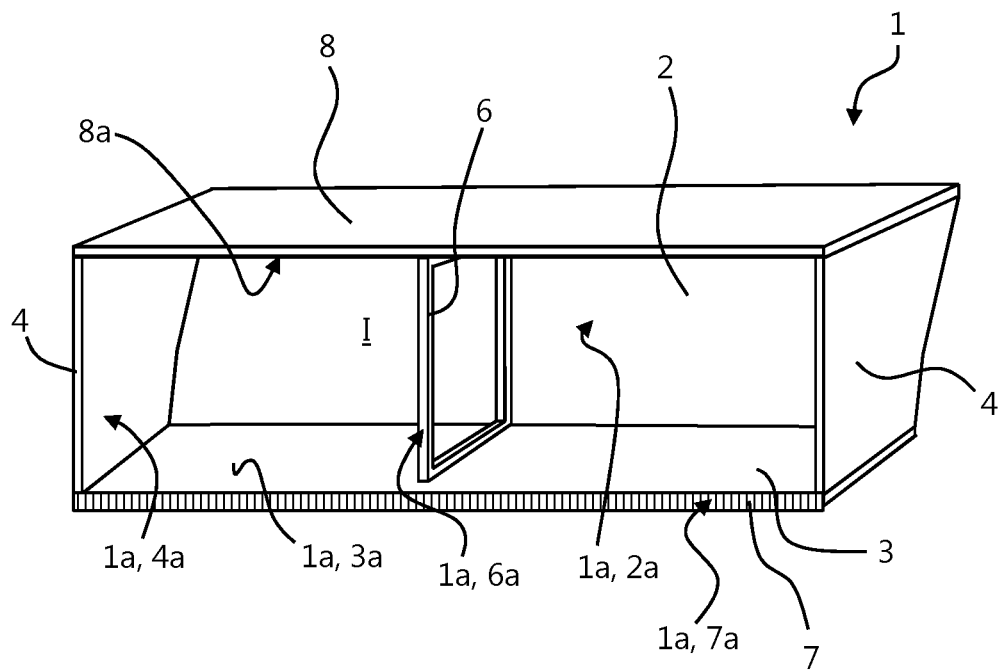
FIG. 6 schematically illustrates an overhead storage bin for an aircraft.

An OHSB 1 for an aircraft (not shown) is schematically illustrated in FIG. 6. As exemplarily shown in FIG. 6, the OHSB comprises a bottom wall 3, a top wall 8 lying opposed to the bottom wall 3, opposed side walls 4 connecting the bottom wall 3 and the top wall 8, and a back wall 2 extending between the side walls 4 and between the bottom wall 3 and the top wall 8. The walls 2, 3, 4, 8 together define an interior I of the OHSB 1. An opening of the OHSB 1 is defined by front edges of the bottom wall 3, the top wall 8, and the side walls 4. A cover or lid 5 may be hingedly or pivotally attached to the top wall 8 or to the side walls 4 so as to be pivotal between a closed position for covering the opening of the OHSB 1 and an open position in which the lid 5 clears the opening of the OHSB 1, as exemplarily shown in FIGS. 1 to 5. Optionally, a stiffening frame 6 may extend between the bottom wall 3 and the top wall 8 within the interior I of the OHSB 1. Further optionally, an edge cover 7 covering a front edge of a bottom wall 3 may be provided, for example in the form of a metal profile attached to the front edge.

The OHSB 1 is provided for being assembled within a passenger cabin of an aircraft. Typically, the OHSB 1 is mounted to a fuselage structure of the aircraft above passenger seats arranged within the passenger cabin and serves for stowing hand luggage items of the passengers during flight and/or for storing equipment required by the cabin crew.

The holding frame 30 of the system 200 exemplarily shown in FIG. 1 serves for holding an OHSB 1. The holding frame 30 may comprise various carrier profiles 34, 35, 36, for example aluminium or other metal profiles, provided with attachment interfaces 31, 32 for attaching the OHSB 1 thereto. The holding frame 30 shown in FIG. 1 comprises a first horizontal profile 34, a vertical profile 35 extending transverse to and from the horizontal profile 34, and a second horizontal profile 36 extending transverse from the vertical profile 35, preferably parallel to the first horizontal profile 34. The frame 30 exemplarily shown in FIG. 1 comprises a first attachment interface 31 provided at the vertical profile 35 and a second attachment interface 32 provided at the second horizontal profile 36. The attachment interfaces 31, 32 may for example be realized as bores or holes.

As schematically illustrated in FIG. 1, the OHSB 1 may be attached to the attachment interfaces 31, 32 of the holding frame 30 by means of bolts, screws or similar fixation devices 37. The OHSB 1 may comprise respective mounting structures 9A, 9B for mounting the OHSB 1 to the attachment interfaces 31, 32. The mounting structures 9A, 9B may for example be realized as fittings extending from the top wall 8 and the back wall 2 of the OHSB 1, as schematically shown in FIG. 1.

The measuring device 40 serves for and is configured and arranged to capture or measure physical quantities characterizing a damage parameter of the OHSB 1. For example, the measuring device 40 may comprise a optical sensors such as a camera or similar for capturing movement of the OHSB 1 when a force is applied to the OHSB 1 or for scanning a surface of the OHSB 1. Additionally or alternatively, the measuring device 40 may comprise one or more force sensors such as strain gauges, piezo resistive sensors or pressure sensors for capturing a resulting force at the OHSB 1 when a force is applied to the OHSB 1. Movement or a resulting forces that are captured when a force is applied to the OHSB 1 are physical quantities characterizing a damage parameter of the OHSB 1 since a vibration characteristic of the OHSB 1 may be determined from each of these quantities, and since the vibration characteristic of the OHSB 1 changes when the OHSB 1 is damaged. Geometric characteristics of the OHSB 1 such as cracks in a surface or changes in the spatial relationship of components of the OHSB 1, for example an angle or distance between respective walls 2, 3, 4, 8 of the OHSB 1 characterize a damage parameter and, thus, may be optically detected by the measuring device 40.

The robotic device 100 comprises a manipulator 10, and a guiding device 20. As exemplarily shown in FIG. 1, the manipulator may comprise a first axially movable robotic arm 11, a second robotic arm 12 kinematically coupled to the first robotic arm 11 and being pivotal about a first axis, and a third robotic arm 13 kinematically coupled to the second robotic arm 12 and being pivotal about a second axis. Generally, the manipulator 10 comprises at least one robotic arm 11, wherein the manipulator 10 is configured to move the at least one robotic arm 11 in at least one spatial dimension. Optionally, the manipulator 10 may be configured to effect a movement of an effector interface 14 in more than one spatial dimension, preferably in three spatial dimensions. The effector interface 14 may be realized as a flange which is mounted to an end portion of the first robotic arm 11 and preferably is movable about at least one pivotal axis as symbolically illustrated in FIG. 1.

The guiding device 20 is coupled to the robotic arm 11 of the manipulator 10, for example by means of the effector interface 14. As schematically shown in FIG. 1, the guiding device 20 comprises a carrier part 21, a guide mechanism 22, and an optional interlocking mechanism 23. The carrier part 21 may be realized as platform member comprising a plate shaped base portion 21A and a connection portion 21B extending transverse to the base portion 21A. The carrier part 21 may for example be made of a metal material such as aluminium or aluminium alloy or similar. The connection portion 21B may be attached to the effector interface 14. Generally, the guiding device 20 is coupled to the robotic arm 11.

The guide mechanism 22 is mounted to the carrier part 21, for example to the base portion 21A of the carrier part 21 as exemplarily shown in FIG. 1. The guide mechanism may for example comprises a guide rail assembly defining a linear guide track. As exemplarily and schematically illustrated in FIG. 1, the guide rail assembly may comprise a base rail 25 fixed to or integrally formed with the carrier part 21, for example with the base portion 21A of the carrier part 21, and a sliding rail 26 movably guided by the base rail 25. The guide rail assembly thereby defines a linear guide track. The sliding rail 26 comprises or forms an attachment structure 24 configured to mount a test body T thereon. For example, the attachment structure 24 may be formed as a flange, as a receptacle, or similar. In FIG. 1, a hard-top case as typically used as hand luggage item is provided as a test body T. The test body T is fixed to the attachment structure 24 provided at the sliding rail 26. The test body T thereby can be moved relative to the carrier part 21 along the guide track defined by the guide rail assembly. Generally, the guide mechanism comprises an attachment structure 24 for attaching a test body T thereto and defines a guide track for moving the attachment structure 24 relative to the carrier part 21. Optionally, the guide mechanism 22 defines a linear guide track, for example by means of the guide rail assembly as described above.

Since the carrier part 21 is mounted or coupled to the robotic arm 11, the attachment structure 24 and thereby the test body T may be moved relative to the robotic arm 11. In particular, the attachment structure 24 may be movable along the guide track between a retracted position and an extended position. FIG. 1 shows the retracted position and FIG. 4 exemplarily shows the extended position. In the retracted position, the attachment structure 24 is arranged in a first distance to the robotic arm 11, in particular to a mounting site where the carrier part 21 is coupled to the robotic arm 11, for example to the effector interface 14. In the extended position, the attachments structure 24 is arranged in a second distance to the robotic arm 11, in particular to the mounting site where the carrier part 21 is coupled to the robotic arm 11, wherein the second distance is greater than the first distance.

The optional interlocking mechanism 23 serves to hold the attachment structure 24 in a position stationary relative to the carrier part 21. For example, the interlocking mechanism 23 may comprise a locking element 28, such as a bolt or a hook, which is movably mounted to a structure that is stationary relative to the base body 21, for example the base body 21 itself or the base rail 25. At a structure that is stationary with respect to the attachment structure 24, for example the sliding rail 26, a receiving structure (not shown), such as bore or similar, is provided. In a locking state of the interlocking mechanism 23, the locking element 28 is introduced into the receiving structure. As exemplarily shown in FIGS. 1, 2, and 5, the locking element 28 may be contacted to the sliding rail 26 in the locking state. Thereby, movement of the attachment structure 24 and the test body T fixed thereto is mechanically blocked by the interlocking mechanism 23. In a release state, the locking element 28 is retracted or disconnected from the sliding rail 26 as exemplarily shown in FIGS. 3 and 4, thereby allowing the attachment structure 24 to move along the guide track relative to the carrier part 21. Generally, the interlocking mechanism 23 is configured to interlock the attachment structure 24 in a stationary position relative to the carrier part 21, in a locking state, and, in a released state, to allows movement of the attachment structure 24 along the guide track relative to the carrier part 21.

As exemplarily shown in FIG. 1, the robotic device 100 is arranged opposite to the holding frame 30, wherein the at least one robotic arm 11 is movable relative to the holding frame 30, in particular towards and away from the attachment interfaces 31, 32.

The system 200 and the robotic device 100 as described above may be used for an automated method for determining mechanical robustness of an OHSB 1 for an aircraft. Such a method is described in the following by reference to the system 200 and device 100 as exemplarily described above.

For determining mechanical robustness of the OHSB 1 or an ability of the OHSB 1 to withstand mechanical stress, an impact of a test body T against an impact surface 1a of the overhead stowage bin 1 with a predefined impact force is repeatedly effected by means of the robotic arm 11 of a manipulator 10. Further, damage parameters representing a damage of the OHSB 1 are investigated or determined. Generally, impacts of the test body T are effected by performing a plurality of impact cycles. One impact cycle generally comprises moving the test body T towards the impact surface 1a of the OHSB 1 by means of the robotic arm 11 so that the test body pushes against said surface 1a, as exemplarily shown in FIG. 4, and subsequently retracting the test body T from the impact surface 1a by retracting the robotic arm 11, as exemplarily shown in FIG. 5. Thereby, in an automated fashion mechanical load can be imparted to the OHSB 1 with a reliably reproducible impact or pushing force. This remarkably eases the investigation of reasons or conditions that cause damages to the OHSB 1. Damages may for example be cracks in the walls 2, 3, 4, 8 of the OHSB 1, deformation of the OHSB 1, or the optional frame 6 of the OHSB 1 or similar.

In the method shown in FIGS. 1 to 5, a hard-top case is used as a test body T. Generally, the test body T is a rigid body comprising a three dimensional expanse of approximately more than 10 liters and equal or less than 70 liters, wherein the test body optionally is substantially cuboid or substantially cylindrical. Preferably, the test body T comprises a volume between 15 dm$^3$ and 70 dm$^3$. For example, the test body T may comprise a mass between 3 kg and 23 kg.

The impact surface 1a of the overhead stowage bin 1 may be formed by an inner surface 2a, 3a, 4a of one of the walls 2, 3, 4 defining the interior I of the OHSB 1. In the example shown in FIGS. 1 to 5, the inner surface 2a of the back wall 2 forms the impact surface 1a. Of course, other surfaces may serve as the impact surface 1a, for example a surface 5a of the lid 5, a surface 6a of the stiffening frame 6, or a surface 7a of the edge cover 7.

As already discussed above, a damage parameter may for example be given by vibration characteristics of the OHSB 1 or geometric characteristics of the OHSB 1 which may be captured or measured by the measuring device 40. When the test body T is impacted to the impact surface 1a of the OHSB 1 with a predefined impact force, a resulting force may be captured by the measuring device 40. In particular, impacting the test body T to the OHSB 1 results in a vibration of the OHSB 1 which may be captured as progression of the resulting force by the measuring device 40. When the impact force applied by the test body to the OHSB 1 is constant over a number of impact cycles, a damage of the OHSB 1 can be detected by a change in the captured resulting force. For example, the dampening properties of the OHSB 1 change when cracks or other damages occur. Alternatively, it is possible to effect a reference vibration of the OHSB 1 by applying a specific test force to the OHSB 1, for example by means of the test body T or another impact body, before performing the impact cycles, to capture a reference vibration characteristic, to apply the same test force to the OHSB 1 again after a predefined number of impact cycles, to capture a new vibration characteristic of the OHSB 1, and to compare the new vibration characteristic with the reference vibration characteristic for determining presence of a damage. Investigating damage parameters of the OHSB 1, thus, may comprise capturing vibration characteristics of the OHSB 1 at least after a predefined number of impacts of the test body T against the impact surface 1*a*. Another possibility would be to scan the impact surface before and after performing the load or impact cycles in order to optically detect changes in the geometric characteristics of the OHSB 1, e.g. the presence of cracks or similar. Investigating damage parameters of the OHSB 1, thus, may comprise measuring geometric characteristics of the OHSB 1 at least after a predefined number of impacts.

Figure 2:
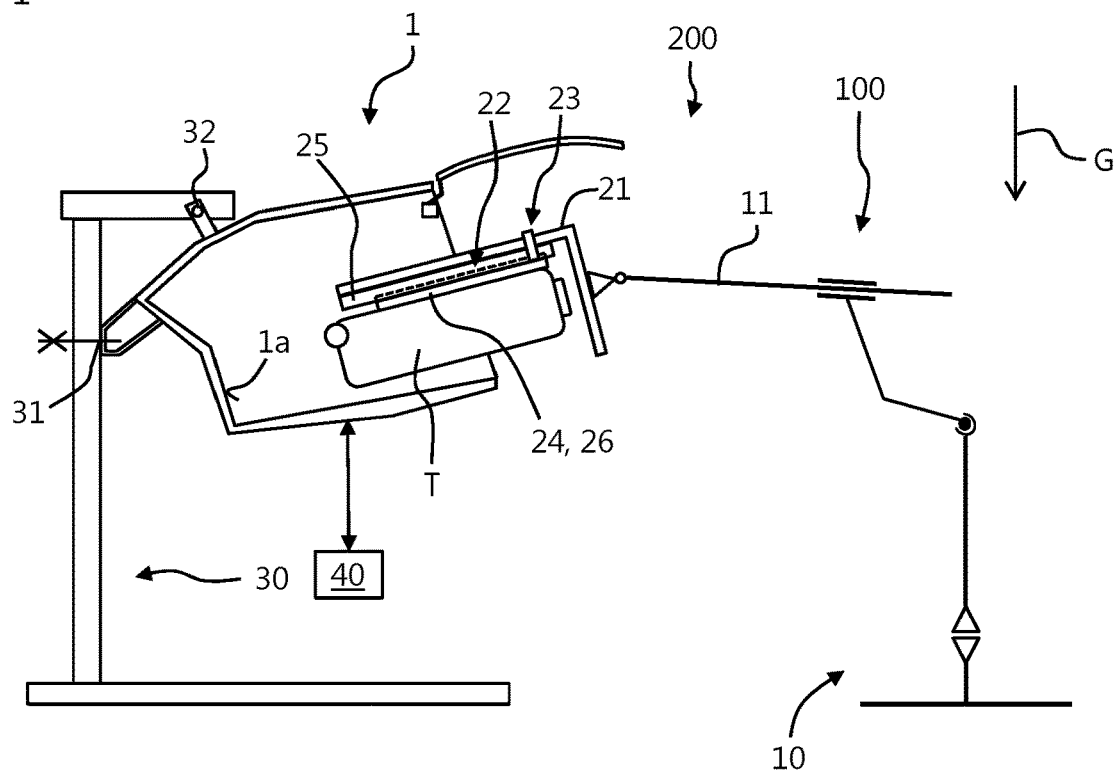
FIG. 2 schematically illustrates the system of FIG. 1 in a further advanced state of the method.
Figure 3:
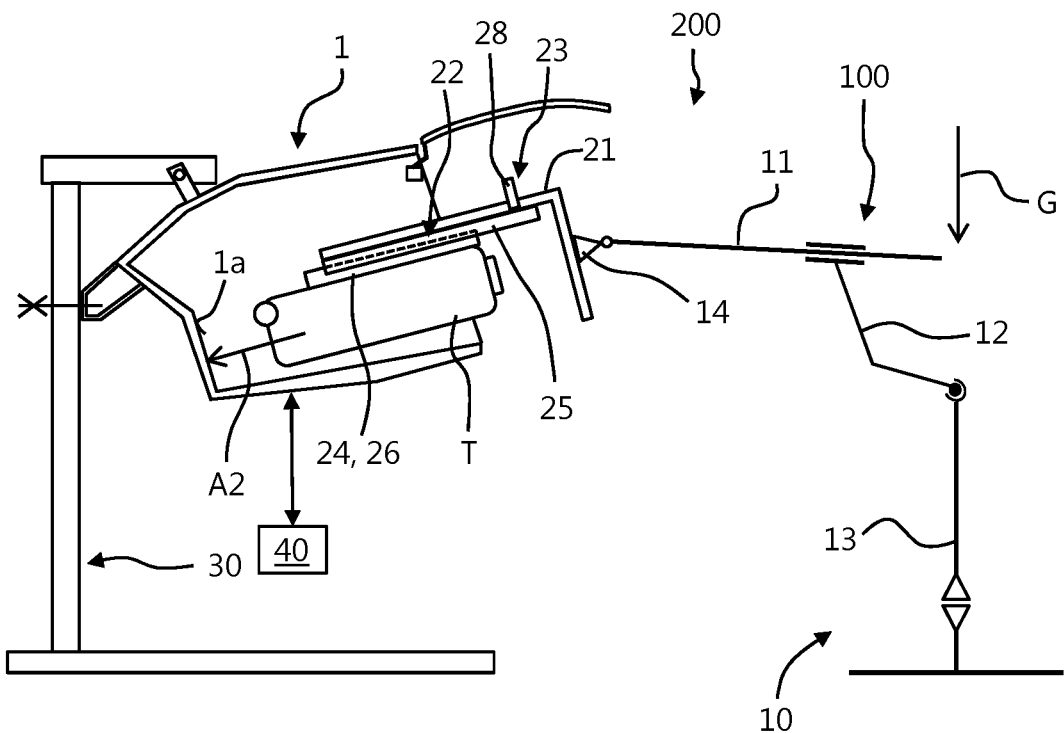
FIG. 3 schematically illustrates the system of FIG. 1 in a further advanced state of the method.

The impact cycle optionally is performed as described in the following. First, the test body T is accelerate towards the impact surface 1*a* to a predefined velocity relative to the impact surface 1*a* by means of the robotic arm 11 of a manipulator 10. This is symbolically indicated in FIG. 1 by arrow A1 indicating the movement of the test body T towards the surface 1*a*. The robotic arm 11 in this step accelerates the guiding device 20, in particular the carrier part 21, wherein the attachment structure 24 of the guide mechanism 22 is optionally interlocked stationary with respect to the carrier part 21 by means of the interlocking mechanism 22. Generally, the robotic arm 11 alone or in combination with other robotic arms 12, 13 of the manipulator 10 moves the test body T in the direction of the impact surface 1*a*. The manipulator 10 may move the test body T along a linear trajectory, a curved trajectory, or a trajectory comprising linear and curved sections as exemplarily indicated by arrow A1 in FIG. 1. Generally, the manipulator 10 is configured to move the test body T along a predefined trajectory relative to the impact surface 1*a*. In FIG. 2, the robotic arm 11 has accelerated the test body T to the desired velocity relative to the impact surface 1*a* and moved further towards the impact surface 1*a* compared to the position of the test body T shown in FIG. 1.

Figure 4:
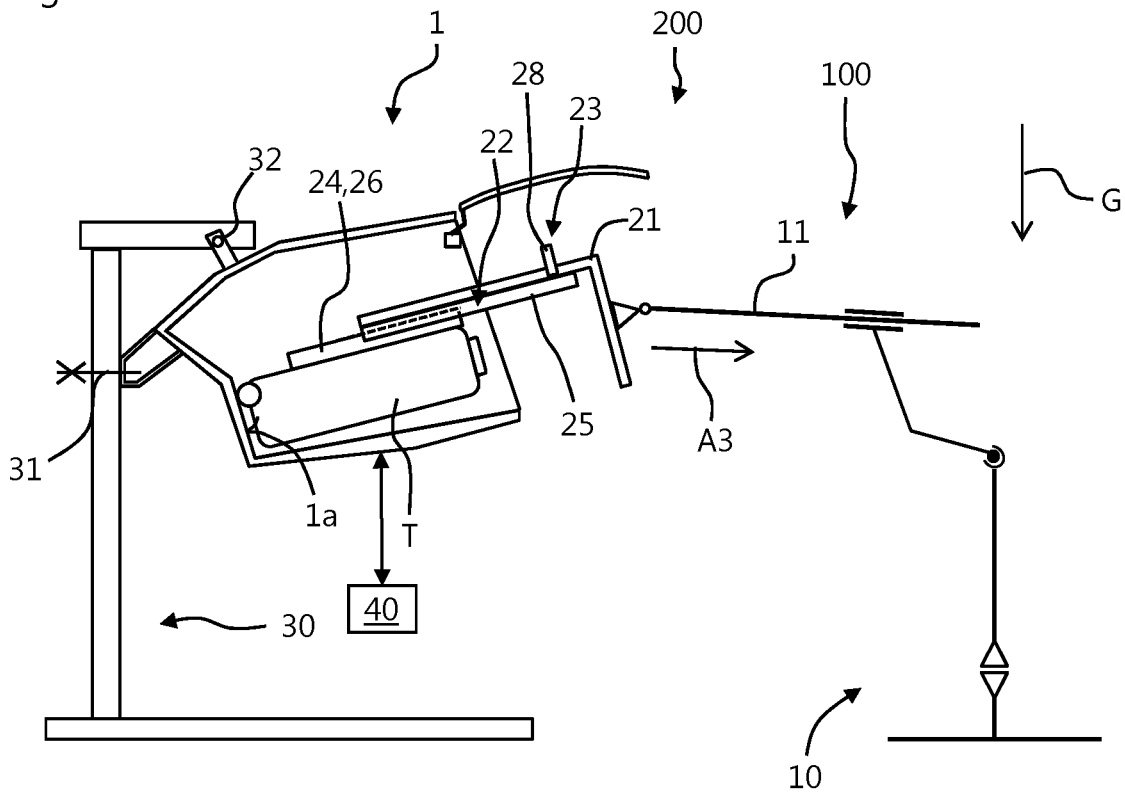
FIG. 4 schematically illustrates the system of FIG. 1 in a further advanced state of the method.
Figure 5:
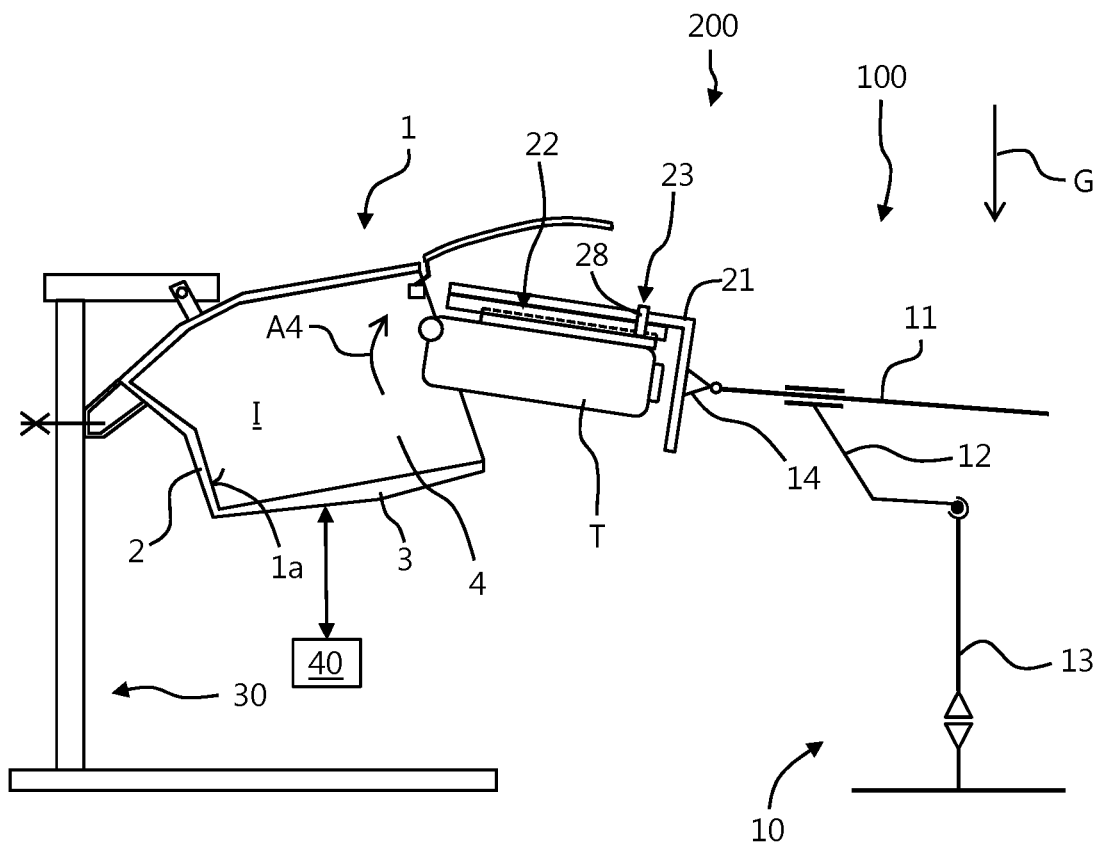
FIG. 5 schematically illustrates the system of FIG. 1 in a further advanced state of the method.

In a further step of the impact cycle, the robotic arm 11 is braked, that is, its velocity is reduced, preferably down to zero. Before movement of the robotic arm stops, the interlocking mechanism 23 is released. For example, the locking element 28 is retracted so as to allow movement of the sliding rail 26 and the test body T attached thereto via the attachment structure 24 relative to the carrier part 21 along the guide track. When the robotic arm 11 and thereby the carrier part 21 is braked, an inertial force acts on the test body T. This inertial force causes the test body T to moving along the guide track away from the robotic arm 11 as indicated by arrow A2 in FIG. 3. As shown in FIG. 4, the guiding mechanism 22 guides the test body T until it impacts or pushes against the impact surface 1*a*. In particular, the sliding rail 26 moves from the retracted position along the base rail 25 to the extended position.

After effecting the impact of the test body T to the impact surface 1*a*, the test body T is retracted from the impact surface 1*a* by retracting the robotic arm 11 as symbolically indicated in FIG. 4 by arrow A3. Optionally, the carrier part 21 is further pivoted relative to the direction of gravity G such that the test body T is moved back to its retracted position towards the robotic arm 11 along the guide track. By pivoting the carrier part 21 against the direction of gravity G, for example as symbolically illustrated in FIG. 5 by arrow A4, the base portion 21A is positioned inclined relative to the direction of gravity G. Due to the weight of the test body T, gravity force acts to the test body T and the attachment structure 24 such that it causes the sliding rail 26 to slide back at the base rail 25. Pivoting of the carrier part 21 may be effected for example by pivoting the effector interface 14 relative to the first robotic arm 11 and/or by pivoting the first robotic arm 11 by means of pivoting the second robotic arm 12.

Optionally, when the test body T or the attachment structure 24 has reached its retracted position, the interlocking mechanism 23 is actuated to its interlocking state for interlocking the test body T or the attachment structure 24 in the retracted position relative to the carrier part 21.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the seat modules and aircraft infrastructure can be applied accordingly to the aircraft or spacecraft according to the invention and the method according to the invention, and vice versa.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining mechanical robustness of an overhead stowage bin for an aircraft, the method comprising:
providing a manipulator having at least one axially movable robotic arm,
coupling a test body simulating hand luggage to the robotic arm by a guiding device comprising a carrier part having a plate-shaped base portion and a connection portion transverse to the plate-shaped base portion, wherein the connection portion is attached to the robotic arm, and a linear guide track and being mounted to the carrier part configured to allow the test body simulating hand luggage to be guided relative to the robotic arm along the guide track by the guiding device,
wherein the guiding device comprises an interlocking mechanism which, in a locking state, interlocks an attachment structure of the guiding mechanism in a stationary position to the plate-shaped base portion relative to the carrier part, and the movement of the attachment structure of the guiding mechanism and the test body simulating hand luggage are mechanically blocked by the interlocking mechanism, and wherein the connection portion includes a first side disposed at a first distance from a first side of the test body simulating the hand luggage in a retracting movement direction, accelerating the test body simulating hand luggage towards an impact surface of the overhead stowage bin at a predefined velocity relative to the impact surface using the robotic arm of the manipulator, bringing the robotic arm to a sudden stop, releasing the interlocking mechanism which interlocks the test body simulating hand luggage stationary relative to the carrier part before stopping the robotic arm, the test body simulating hand luggage impacting the impact surface once released, interlocking the test body simulating hand luggage relative to the carrier part using the interlocking mechanism, retracting the guiding mechanism to a second position wherein the first side of the connection portion is at a second distance from the first side of the test body simulating the hand luggage, wherein the second distance is greater than the first distance, retracting the test body simulating hand luggage from the impact surface, repeatedly effecting the impact of the test body simulating hand luggage against the impact surface by the above steps; and investigating damage parameters of the overhead stowage bin.

2. The method according to claim 1, wherein impact cycle further comprises:

pivoting the carrier part relative to the direction of gravity (G) such that the test body simulating hand luggage is moved back towards the robotic arm along the guide track into a retracted position after effecting the impact of the test body simulating hand luggage to the impact surface.

3. The method according to claim 1, wherein the test body simulating hand luggage comprises a mass between 3 kg and 23 kg.

4. The method according claim 1, wherein the test body simulating hand luggage comprises a volume between 15 $dm^3$ and 70 $dm^3$.

5. The method according to claim 1, wherein the test body simulating hand luggage is a hard-shelled suitcase.

6. The method according to claim 1, wherein the impact surface of the overhead stowage bin is formed by one of an inner surfaces of a wall defining an interior (I) of the overhead stowage bin, a surface of a lid for closing the overhead stowage bin, a surface of a stiffening frame of the overhead stowage bin, and a surface of an edge cover covering a front edge of a bottom wall of the overhead stowage bin.

7. The method according to claim 1, wherein investigating damage parameters of the overhead stowage bin comprises:

capturing vibration characteristics of the overhead stowage bin at least after a predefined number of impacts and/or measuring geometric characteristics of the overhead stowage bin at least after a predefined number of impacts.

8. A robotic device for imparting mechanical load to an overhead stowage bin for an aircraft and having an impact surface, comprising:

a manipulator comprising at least one axially movable robotic arm, the guiding device comprising a carrier part having a plate-shaped base portion and a connection portion transverse to the plate-shaped base portion, wherein the carrier part includes a guide mechanism mounted thereto, a guiding device attached to one end of said at least one axially movable robotic arm, wherein the guide mechanism comprises a guide rail assembly defining a linear guide track, and an attachment structure for attaching a test body simulating hand luggage thereto, wherein the guiding device comprises an interlocking mechanism which, in a locking state, interlocks the attachment structure of the guiding mechanism in a stationary position to the plate-shaped base portion relative to the carrier part, and the movement of the attachment structure of the guiding mechanism and the test body simulating hand luggage are mechanically blocked by the interlocking mechanism, and, wherein the connection portion includes a first side disposed at a first distance from a first side of the test body simulating the hand luggage in a retracting movement direction, and in a released state, allows movement of the attachment structure along the guide track relative to the carrier part, retracting the guiding mechanism to a second position wherein the first side of the connection portion is at a second distance from the first side of the test body simulating the hand luggage, wherein the second distance is greater than the first distance, and wherein said manipulator is configured to accelerate and move the test body simulating hand luggage toward the impact surface and for the interlocking mechanism to release the attachment structure for the test body simulating hand luggage to impact the impact surface.

9. A system for determining mechanical robustness an overhead stowage bin for an aircraft, comprising:

a holding frame comprising attachment interfaces for attaching the overhead stowage bin;

a measuring device for measuring physical quantities characterizing a damage parameter of the overhead stowage bin; and a robotic device according to claim 8.

* * * * *